United States Patent

Degand

Patent Number: 5,108,054
Date of Patent: Apr. 28, 1992

[54] TUBE ANCHOR

[75] Inventor: Leonard G. Degand, Prospect Heights, Ill.

[73] Assignee: Adler-Norco, Inc., North Chicago, Ill.

[21] Appl. No.: 749,505

[22] Filed: Aug. 16, 1991

Related U.S. Application Data

[63] Continuation of Ser. No. 590,685, Oct. 1, 1990.

[51] Int. Cl.⁵ .............................................. F16L 3/00
[52] U.S. Cl. ....................................... 248/50; 248/60; 248/74.2
[58] Field of Search ................ 248/50, 74.2, 60, 613, 248/612, 601, 602, 56, 71, 231.91; 174/138 H, 138 R; 338/315; 313/50

[56] References Cited

U.S. PATENT DOCUMENTS

| | | |
|---|---|---|
| 1,704,472 | 8/1925 | Grandjean . |
| 1,792,611 | 3/1929 | Staaf, Jr. . |
| 1,814,831 | 10/1929 | Covey ........................... 248/50 |
| 1,995,398 | 3/1935 | Rainboth .................. 248/231.91 X |
| 2,050,559 | 8/1936 | Budnick ........................ 248/50 |
| 2,744,705 | 10/1952 | Richter ......................... 248/50 |
| 2,850,560 | 11/1954 | Heyob et al. .................... 248/50 |
| 3,011,744 | 12/1961 | Morgan, Jr. ..................... 248/50 |
| 3,135,488 | 11/1962 | Leonard . |
| 3,210,030 | 10/1965 | Ramsey et al. .................. 248/71 |
| 3,501,117 | 3/1970 | Soltysik ......................... 248/71 |
| 3,568,964 | 3/1971 | Perkins ....................... 248/71 X |
| 3,905,570 | 9/1975 | Nieuwveld ...................... 248/71 |
| 4,566,660 | 1/1986 | Anscher et al. ................ 248/74.2 |
| 4,666,109 | 5/1987 | Fallon et al. .................... 248/50 |
| 4,784,358 | 11/1988 | Kohut ........................... 248/71 |
| 4,806,895 | 2/1989 | Petrow ....................... 248/71 X |

Primary Examiner—Karen J. Chotkowski
Attorney, Agent, or Firm—Emrich & Dithmar

[57] ABSTRACT

A tube anchor for supporting a neon tube or the like comprises a base, a spring disposed in the base and a stem secured in the base and surrounded by the spring. The stem includes a shaft, a saddle at one end for snappingly receiving a neon tube, and a pair of legs at the other end. The legs are resiliently carried by the shaft so that they can pass through a reduced diameter portion located at the middle of the spring. A barb is resiliently carried by each of the legs. The barbs preclude removal of the stem from the base after the stem is secured in the spring.

6 Claims, 2 Drawing Sheets

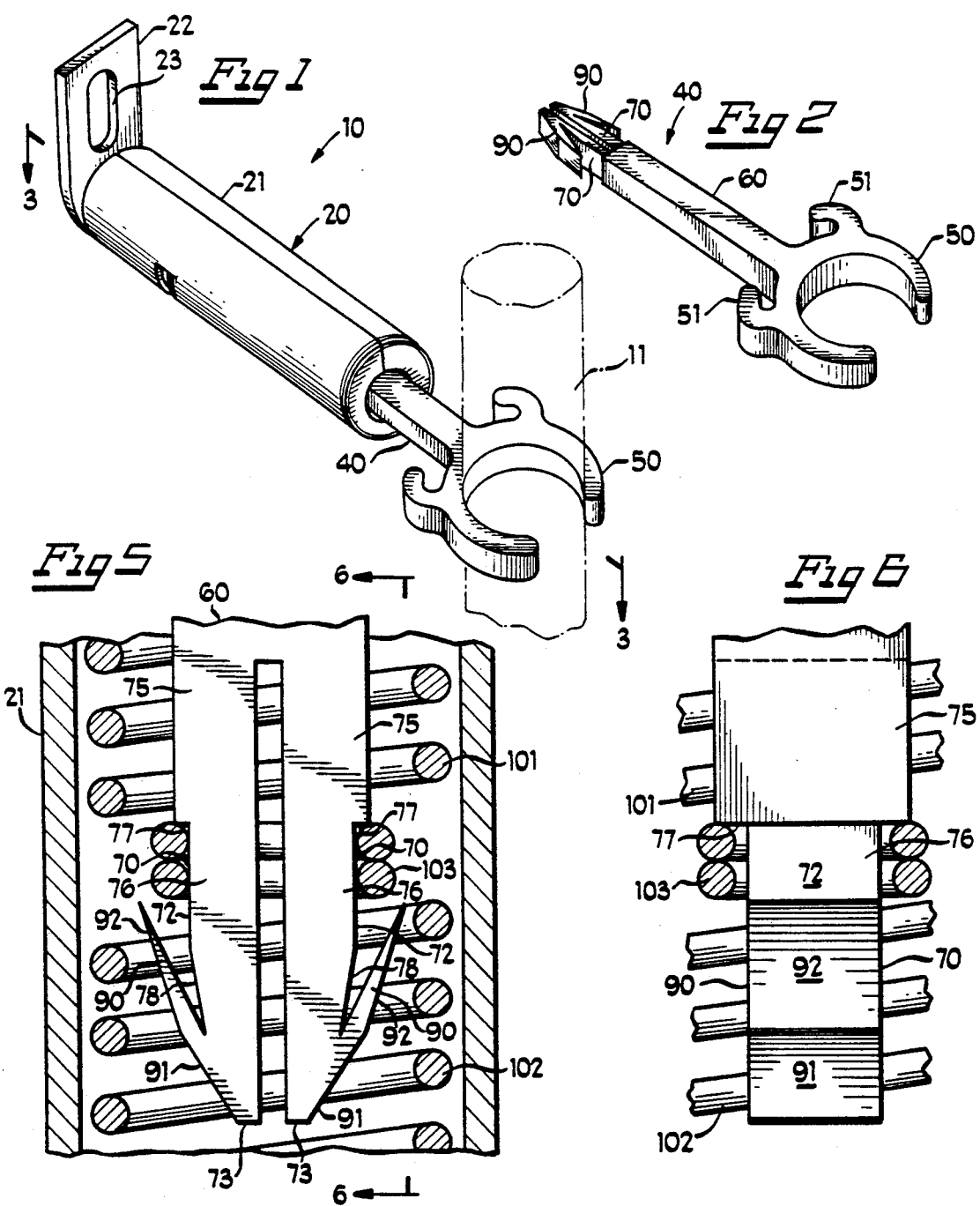

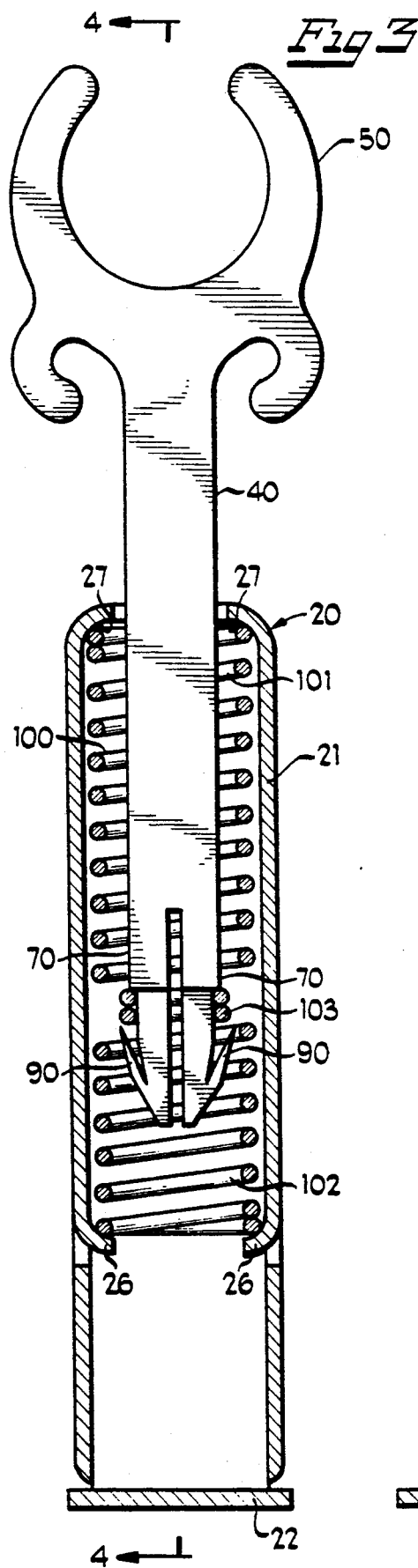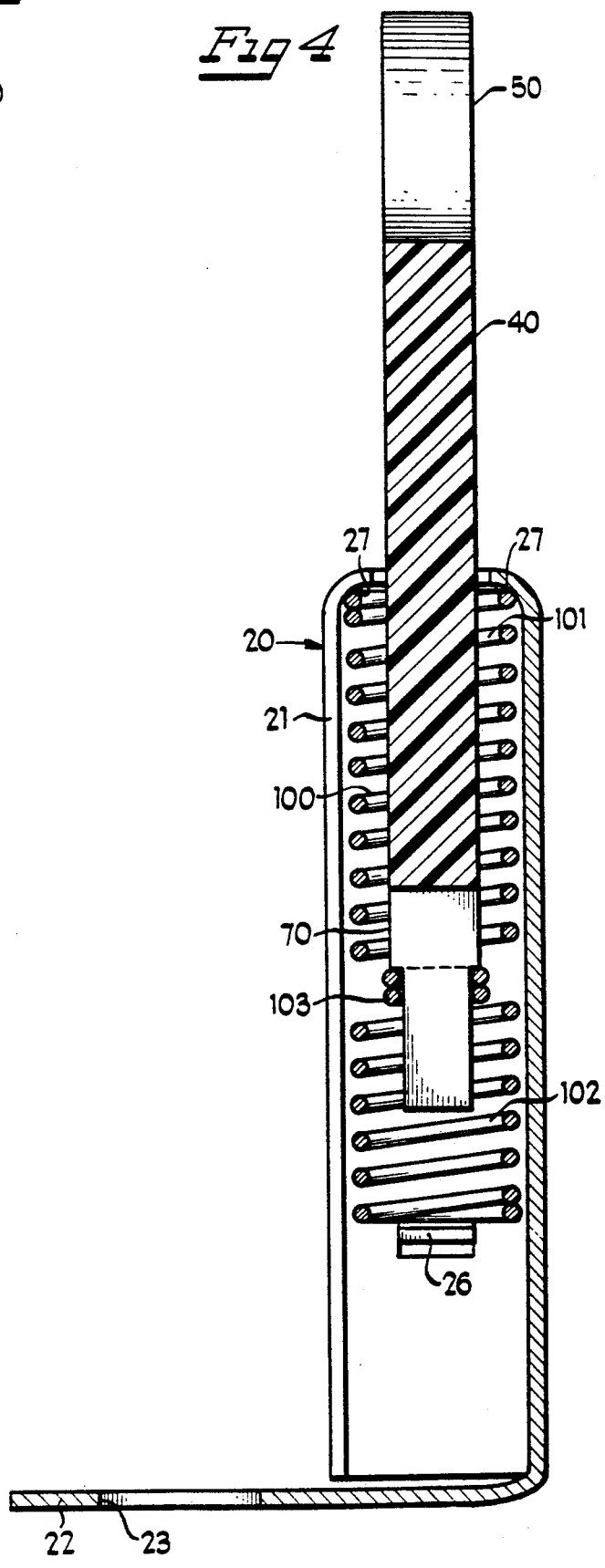

TUBE ANCHOR

This is a continuation of application Ser. No. 590,685, filed Oct. 1, 1990.

BACKGROUND OF THE INVENTION

The present invention relates generally to an anchor for neon tubing and the like and, more particularly, to such an anchor having an improved stem.

Luminous signs of the neon-tube type are comprised of a frame upon which is mounted glass tubing bent in a particular shape. The glass tubing is supported in spaced relation on the frame by a plurality of anchors secured to and extending outwardly from the frame.

Prior-art anchors include a tubular base and a spring and a plastic stem located in the base. The stem has a saddle for snappingly receiving the glass tubing. The other end of the stem is generally cone shaped so as to be insertable into, and retained by the spring. In the past, the spring has been assembled by spinning the stem into the spring.

The spinning method is accomplished by using a power drill; as a result, the stem may be under or over driven which results in an incorrect height. The spinning approach is time consuming.

SUMMARY OF THE INVENTION

It is a general object of the present invention to provide a tube anchor having an improved stem which avoids the disadvantages of prior tube anchors while affording additional structural advantages.

Another object is to enable the stem to be pushed into place.

Another object is to be able to assemble the stem in the spring without spinning it.

Another object is to provide a stem which is securely retained by the spring.

Another object is to simplify and speed up the process of manufacturing and assembling a tube anchor.

Another object is to provide an anchor including a stem having a spring-engaging end with improved resiliency to simplify assembly.

In summary, there is provided a stem for a tube anchor comprising a shaft, a pair of longitudinally extending legs at one end of said shaft, and a pair of barbs extending outwardly respectively from said legs.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a tube anchor constructed in accordance with the features of the present invention;

FIG. 2 is a perspective view of the stem in FIG. 1;

FIG. 3 is an enlarged cross-sectional view of the tube anchor taken along the line 3—3 of FIG. 1;

FIG. 4 is a cross-sectional view taken along the line 4—4 of FIG. 3;

FIG. 5 is a further enlarged view of a portion of FIG. 3 with a portion of the base and stem broken away; and FIG. 6 is a cross-sectional view taken along the line 6—6 of FIG. 5.

DETAILED DESCRIPTION OF THE PREFERRED EMBODIMENT

Turning now to the drawings, and more particularly to FIG. 1 thereof, there is depicted a tube anchor 10 constructed in accordance with the present invention. Anchor 10 is adapted and constructed to support glass tubing 11 (neon, for example) in spaced relation from a support frame (not shown). The anchor 10 includes a one-piece base 20 and a stem 40. A C-shaped saddle 50 at one end of stem 40 snappingly receives the tubing 11. Base 20 is preferably made of sheet metal and is bent to form a hollow post 21 and a flange 22. A screw or bolt extends through a hole 23 in flange 22 for fastening the anchor 10 to the support frame. A plurality of these anchors would be fastened to the support frame at locations determined by the shape of the tubing 11. The ends of post 21 are deformed to define inwardly directed shoulders 26 and 27.

Referring to FIG. 2, stem 40 is preferably made of high-strength plastic and has a shaft 60, saddle 50 being at one end thereof. The recess in saddle 50 has a diameter generally equal to the diameter of the tubing 11 for snappingly receiving and securing same. The saddle 50 has a pair of hooks 51 used to receive a wire (not shown) to be tightened around tubing 11, if so desired.

Referring to FIGS. 5 and 6, stem 40 comprises bifurcated legs 70 which extend longitudinally outwardly from the other end of shaft 60 and which are resiliently carried thereby to allow movement toward each other. Each leg 70 has a relatively wide portion 75, a relatively narrow portion 76, and a shoulder 77 extending radially therebetween. The outer surface of each leg has a segment 72 that extends parallel to the longitudinal axis of shaft 60 and has a segment 78 tapering inwardly. Two barbs 90 extend outwardly respectively from legs 70 and are resiliently carried thereby to allow them to be flexed toward such legs. The outer surface of each barb is divided into a steep front segment 91 and a shallower rear segment 92.

Anchor 10 further comprises a metal spring 100 including end portions 101 and 102, and an intermediate portion 103 (FIGS. 3 and 4). Each end portion 101 and 102 has a diameter greater than the diameter of intermediate portion 103.

During assembly, spring 100 is placed in post 21 against shoulders 26. The end of post 21 away from flange 22 is crimped to form shoulder 27 to retain spring 100. Stem 40 is pushed into base 20 by inserting shaft 60 through the opening in shoulder 27. Stem 40 is pushed through portion 101 with little or no contact therewith since the diameter of portion 101 is preferably slightly greater than the distance between barbs 90. As stem 40 continues to be pushed into position surface segments 91 of barbs 90 contact spring portion 103. Segments 91, being tapered, guide shaft 60 into portion 103. The outer ends of segments 91 contact portion 103, causing legs 70 to deflect toward each other.

As stem 40 continues to be inserted, surface segment 92 of each barb 90 contacts spring portion 103. Since the barbs 90 are resiliently carried by legs 70, they are deflected toward each other to clear portion 103. The fact that surface segments 78 taper inwardly increases the extent to which barbs 90 can flex inwardly. Also, such tapering decreases the thickness of the hinge joint at the junction of each barb and leg, thereby enabling greater ability to flex.

After barbs 90 have passed through spring portion 103, legs 70 and barbs 90 snap back to the position shown in FIG. 3, thereby precluding retrograde movement of stem 40. Stem 40 is thus secured in post 21. When shoulders 77 contact portion 103, stem 40 can be pushed no further.

Shoulders 77 and barbs 90 cooperate with spring portion 103 to limit the extent of posigrade and retrograde movement of stem 40.

Preferably, surface segments 92 are tapered less than segments 91 so that the distance between the tips of barbs 90 is greater than the outer diameter of spring portion 103, but not so great as to contact spring portion 102 during stem insertion. This facilitates and speeds up insertion of the stem.

The above-described construction means that the assembler need not exert great care in locating stem 40 in place. He pushes enough to cause barbs 90 to pass spring portion 103. He does not have to be concerned about pushing too far. Even if the end 73 of stem 40 bottoms out, as soon as he releases the stem, it will automatically return to the position depicted in FIG. 5 which is the rest condition of the spring. With legs 70 and barbs 90, shaft 60 can be pushed into spring 100 easily and positively.

What has been described therefore is an anchor 10 including an improved stem 40 which can be rapidly assembled with the other parts of an anchor.

What is claimed is:

1. An anchor for supporting a neon tube and the like comprising: a generally tubular base including an interior and an aperture at one end and means at an opposite end for fastening said base to a frame, a spring disposed in the interior of said base and including first and second portions and an intermediate portion of reduced diameter, and a stem secured in said base and surrounded by said spring, said stem including a shaft and a saddle at one end of said shaft and a pair of legs at the other end of said shaft, and a pair of barbs extending outwardly respectively from said legs, said saddle being constructed and arranged to snappingly receive a neon tube, said legs being resiliently carried by said shaft to allow movement of said legs towards each other to reduce the width of said shaft and allow said legs to pass through said intermediate portion of said spring, said barbs being resiliently carried by said legs to allow flexing of said barbs towards said associated legs to allow said legs to pass through said intermediate portion, said barbs flexing away from said associated legs after the passing of said barbs through said intermediate portion to lock said stem in said base and to preclude removal of said stem from said base.

2. The anchor of claim 1, wherein each of said legs has first and second portions and a shoulder between said first and second portions, said first portion of said legs having a width greater than the widths of said second portion of said legs and said intermediate portion of said spring, said shoulder preventing posigrade movement of said first portion of said legs through said intermediate portion of said spring, said barbs extending outwardly respectively from said second portions of said legs.

3. The anchor of claim 1, wherein each of said barbs has a shallower entering portion and a steeper trailing portion.

4. A stem for a tube anchor comprising: a pair of laterally spaced-apart legs each having first and second ends, a solid shaft interconnecting said legs at said first ends thereof and extending therefrom away from said second ends along a longitudinal axis disposed between said legs, each of said legs being substantially shorter than said shaft and having an outer side surface on the side thereof away from said axis, said outer side surfaces respectively including tapering portions converging toward the distal end of said legs, and a pair of barbs extending laterally outwardly respectively from said tapering portions adjacent to the distal ends of said legs and being flexibly moveable toward and away from said tapering portions.

5. The stem of claim 4, wherein each of said legs has first and second portions, and a shoulder between said first and second portions, said barbs extending outwardly respectively from said second portions.

6. The stem of claim 4, wherein each of said barbs has an entering portion inclined at a first angle to said axis and a trailing portion inclined at a second angle to said axis less than said first angle.

* * * * *